Sept. 5, 1967 W. W. SANFORD 3,340,410

PIEZOELECTRIC CRYSTAL ASSEMBLY

Filed Aug. 5, 1964

2 Sheets-Sheet 1

INVENTOR
WILLIAM W. SANFORD

BY Hyatt & Dowell I + II
ATTORNEYS

PIEZOELECTRIC CRYSTAL ASSEMBLY

Filed Aug. 5, 1964

2 Sheets-Sheet 2

INVENTOR
WILLIAM W. SANFORD

BY

H. Yates Dowell I & II
ATTORNEYS

United States Patent Office 3,340,410
Patented Sept. 5, 1967

3,340,410

PIEZOELECTRIC CRYSTAL ASSEMBLY

William W. Sanford, Orlando, Fla., assignor, by direct and mesne assignments, to Wave-Lock, Inc., Orlando, Fla.

Filed Aug. 5, 1964, Ser. No. 387,714
2 Claims. (Cl. 310—9.1)

Figures 1, 2:
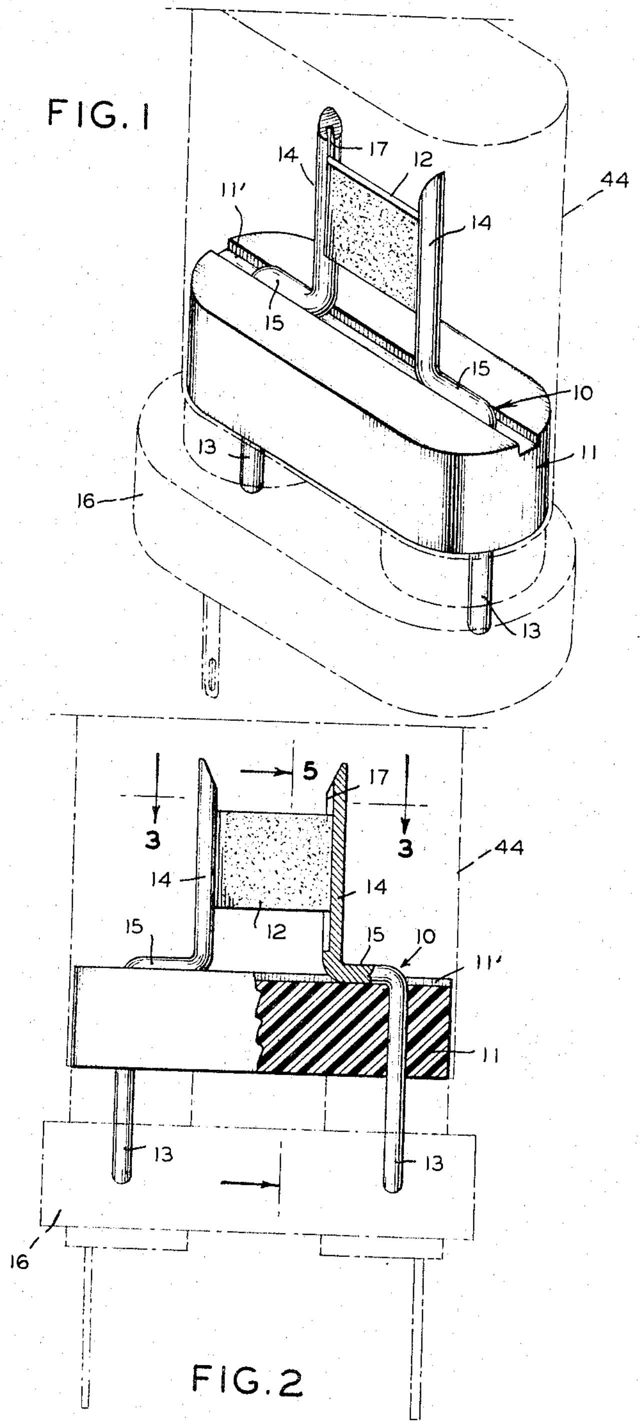

This invention relates to electrical components of various kinds, to the fabrication and assembling of the same, and to the utilization in electrical circuits employed in various types of transmissions of electrical energy for use in numerous ways.

This invention relates particularly to piezoelectric crystals or substances which when subjected to mechanical stress produce electrical potentials on the faces of such substances and when electrical potentials are applied to any of such faces the result is mechanical distortion of the substances of which the crystals are composed.

It is well known that certain substances or materials, including crystalline quartz, have the property of exchanging energy between the electrical and mechanical aspects of the same and that mechanical force applied in a particular or proper direction to the material will produce an electrical potential on the surface of the material, and conversely an applied electrical potential will result in mechanical displacement of the material, with such phenomenon known as the piezoelectric effect.

An alternating electric current or voltage of the correct frequency applied across the proper sides of a quartz crystal will cause it to vibrate, mechanically producing a resonance at a frequency determined by the mechanical dimensions of the quartz crystal, and at such resonant frequency the exchange of energy between the electrical and mechanical phases is extremely efficient with very little energy dissipated in the crystal. The frequency of this resonance is very sharply defined and quartz crystals have equivalent Q's or sharpness of resonance of 10,000 to 100,000. It is also known that the physical and electrical properties of quartz have small temperature coefficients of vibration, thus making quartz crystals ideal frequency stabilizing elements.

Quartz crystals are used extensively to control the frequency of radio frequency oscillators and as filter elements for which they are particularly suitable because of their stability, selectivity, excellent operating life, and on account of their low cost. Methods have been developed and utilized to produce large quantities of synthetic quartz, thus making available dependable sources of raw material of high quality. The assembling and processing of quartz crystal devices have been unsatisfactory because of the excessive time involved and the tedious manual method almost universally employed in the fabrication of such finished devices. This slow tedious and impractical manner of fabrication has been due at least in part on account of the fact that the physical structure of the available mounting and electrode devices has not permitted handling by mechanical means, or else satisfactory mechanical means for handling has not been discovered. Further, the various methods of processing quartz crystal have involved serious problems, with a detrimental effect on the performance of the finished product.

It is an object of the present invention to provide a piezoelectric crystal assembling and process of manufacturing and assembling which includes a base and an electrode assembly of mechanical and electrical stability without mechanically damping or interfering with the free vibration of the quartz and which permanently locks the crystal in a fixed position in the electrodes, as well as a crystal assembly of this character which can be conveniently handled by mechanical means in an automated fabrication process and assembly.

Another object of the invention is to provide a simple inexpensive readily reproduceable competitive piezoelectric crystal which can be accurately and consistently reproduced in large quantities at low cost by automatic machinery with minimum human attention and supervision.

Figures 3, 4, 5:
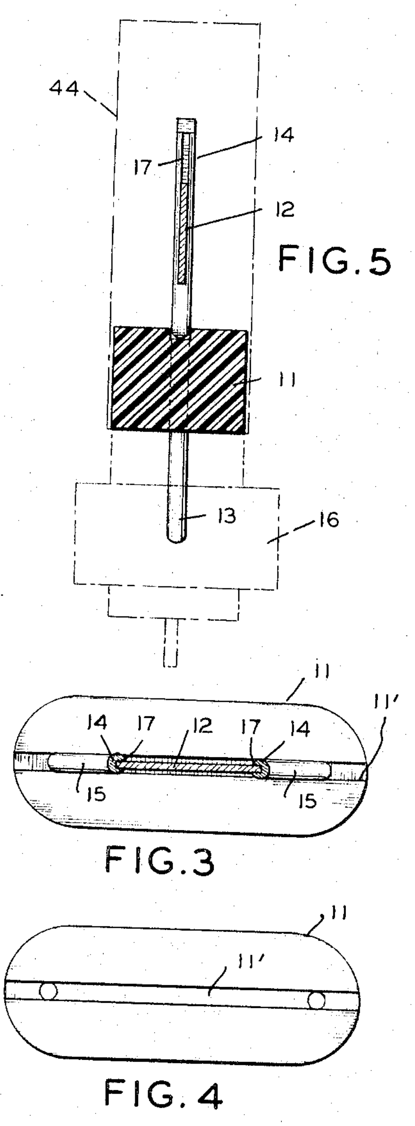
Figures 6, 7:
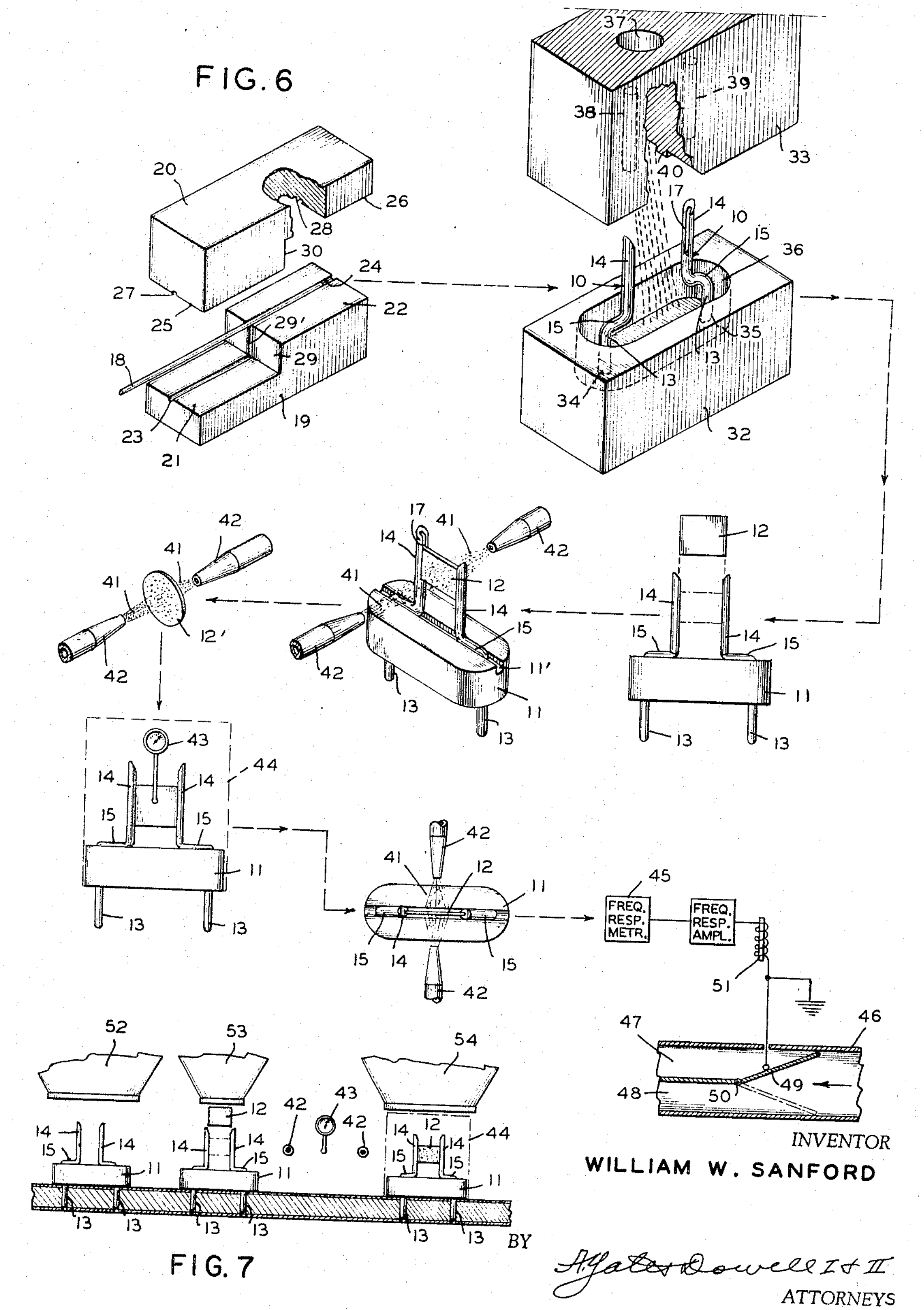

Other objects and advantages of the invention will be apparent from the following description considered in conjunction with the accompanying drawings wherein:

FIG. 1 is a perspective of a crystal assembly in accordance with the present invention;

FIG. 2, a side elevation, partly in section;

FIG. 3, a horizontal section on the line 3—3 of FIG. 2;

FIG. 4, a top plan view of the insulating base itself;

FIG. 5, a vertical section on the line 5—5 of FIG. 2;

FIG. 6, a schematic view or layout illustrating the steps in the process; and

FIG. 7, a fragmentary side elevation illustrating the manner of inserting the crystal.

The piezoelectric crystal assembly of the present invention comprises a pair of electrodes 10, a base or holder 11, and a quartz or piezoelectric crystal 12. The electrodes have lower and upper portions 13 and 14 with a connecting and offsetting portion 15 in order that the lower extremities 13 may be spaced the right distance to be inserted in receiving openings of an electrical receptacle or socket member 16. The upper portions 14 are more closely spaced to receive therebetween a quartz or piezoelectric crystal of smaller dimensions. Further, each upper portion 14 is provided with a groove 17 lengthwise of each upper portion and with the upper portions facing each other in order that the crystal may be inserted between such opposed parallel grooves or channelways and of a size to snugly receive the crystal therebetween.

A piezoelectric crystal assembly may be produced in accordance with the present invention by feeding a length or strand of wire 18 between a pair of lower and upper dies 19 and 20, the lower die 19 having stepped surfaces 21 and 22 with grooves 23 and 24 in which the wire 18 is received and the upper die 20 having stepped surfaces 25 and 26 with grooves 27 and 28, such groove 28 having a central rib which forms a slot in the wire when the dies are moved into contact one with the other. The grooves 27 and 28 complement the grooves 23 and 24 so that the wire 18 is securely received in such grooves. The die 19 is provided with a shoulder 29 with a groove 29' between its stepped surfaces 21 and 22 while the die 20 is provided with a shoulder 30 between the surfaces 25 and 26. The wire 18 is thus formed into the electrode 10 of the length and configuration as illustrated in FIG. 2.

In the practice of the process, the pair of electrodes 10 are placed in a combination jig and molding die 32 which operates in conjunction with a cooperating die 33. The jig or molding die 32 is provided with openings 34 and 35 in which the lower extremities or prongs 13 are adapted to be inserted. The jig and molding die 32 is provided with a mold cavity 36 which may be filled with an insulating material which constitutes the base 11.

The upper mold die 33 has a feed channel 37 through which such insulating or dielectric material is supplied, the mold having openings 38 and 39 in which the crystal holding portions of the electrodes are received as the upper mold die is moved downwardly. In order to secure the electrodes in fixed relation to the base or holder 11, such base is provided with a channel 11', and to form this channel, the mold die 33 is provided on its underside with a rib 40, such rib corresponding in depth and width to the diameter of the offset portion 15 of the electrode 10.

The mounting base 11 may be produced in any desired manner as, for example, by compressing a powder, by introducing a solidifiable fluid of insulating substance and permitting it to set, or in any other desired manner. Thus when formed as directed, the electrodes are disposed in fixed relation with opposed legs having the crystal receiving slots 17 and into such opposed slots or channels a predimensioned crystal can be slidably disposed.

After the predimensioned crystal is applied between the opposed channels, it may be reduced in any desired manner as, for example, by means of the forceable discharge of abrasive particles such as sand and the like 41 through nozzles 42. After the crystal has been sandblasted to the desired predetermined thickness, the thickness of the crystal is measured by a measuring device 43 of any desired character, after which a conductive film of well known conductive substance is applied to the proper sides of the crystal in a manner to provide good electrical connections to the electrodes 14, one side being connected to each electrode.

To complete the crystal assembly, a cover 44 is applied over the crystal and the portions of the electrodes between which the crystal is mounted. The cover is of a size to fit snugly over the mounting base and provide a hermetically sealed air and water-tight joint.

Instead of the crystal 12, a crystal 12′ of other marginal configuration may be provided as illustrated.

After the crystal assembly is completed, it is subjected to a precise frequency measurement by means of a digital frequency meter 45 of conventional character which indicates frequencies directly and the devices are discharged through a discharge 46 which is connected to a pair of discharges 47 and 48 with an oscillatable valve 49 mounted upon a pivot 50 with such valve controlled by a solenoid 51 so that the crystals which meet the test travel in one path and those which do not, in another.

As indicated, the invention contemplates the manufacture of the assembly by automatic machinery with minimum human supervision and at small cost. This is done by providing magazines 52, 53, and 54 for the receipt of molded bases or holders and electrode assemblies, the crystals, and the covers. The base and electrode assemblies are discharged from the magazines, the crystals are fed from the magazine into the base and electrode assembly. Thereafter the reduction in thickness is accomplished after the crystal is in place, the crystal tested for thickness, sprayed with conductive material and the cover is applied and the completed article is discharged.

It will be obvious to those skilled in the art that various changes may be made in the invention without departing from the spirit and scope thereof and therefore the invention is not limited by that which is illustrated in the drawings and described in the specification but only as indicated in the accompanying claims.

What is claimed is:

1. A piezoelectric crystal assembly comprising a pair of electrodes, each of said electrodes having offset upper and lower generally parallel portions connected by an intermediate portion generally perpendicular thereto, the upper portions of said electrodes being substantially parallel with each other and spaced apart a predetermined distance, each upper portion having a channel facing the other upper portion, a holder attached to said lower portions of said electrodes, said holder having a groove for receiving said intermediate portions and non-rotatably mounting said electrodes on said holder, a piezoelectric crystal having opposed faces mounted in said channels, and means for electrically connecting one face of said crystal to one of said electrodes and electrically connecting the opposite face of said crystal to the other of said electrodes.

2. The structure of claim 1 including cover means mounted on said holder and adapted to cover said upper portions and said crystal.

References Cited

UNITED STATES PATENTS

| | | | |
|---|---|---|---|
| 2,392,429 | 1/1946 | Sykes | 310—9.6 |
| 2,471,625 | 5/1949 | Johnstone | 310—9.7 |
| 2,699,508 | 1/1955 | Fastehau | 310—9.6 |
| 2,784,326 | 3/1957 | Purdue | 310—9.4 |
| 2,857,532 | 10/1958 | Ziegler | 310—9.7 |
| 3,176,168 | 3/1965 | Barrett | 310—9.4 |

MILTON O. HIRSHFIELD, *Primary Examiner.*

J. D. MILLER, *Assistant Examiner.*